United States Patent [19]

Pannier

[11] 4,351,274

[45] Sep. 28, 1982

[54] LIVESTOCK FEEDER WITH ADJUSTABLE FEED GATE

[76] Inventor: Steven R. Pannier, P.O. Box 72, McLean, Ill. 61754

[21] Appl. No.: 203,986

[22] Filed: Nov. 4, 1980

[51] Int. Cl.³ .............................................. A01K 5/00
[52] U.S. Cl. ................................................... 119/53.5
[58] Field of Search ............................ 119/53, 53.5, 54

[56] References Cited

U.S. PATENT DOCUMENTS

| | | | |
|---|---|---|---|
| 408,569 | 8/1889 | Andrus | 119/53.5 |
| 1,449,818 | 3/1923 | Harvey | 119/53 |
| 1,719,245 | 7/1929 | Smidley | 119/53.5 |
| 3,019,766 | 2/1962 | Pannier | 119/53.5 |
| 4,246,678 | 1/1981 | Cunningham | 119/54 |

Primary Examiner—Hugh R. Chamblee
Attorney, Agent, or Firm—Harvey B. Jacobson

[57] ABSTRACT

A livestock feeder, which serves as a storage bin for feed as well as a feeder, has a plurality of partitioned feeding troughs into which selective amounts of feed may be directed through the movement of an agitator operated by the feeding livestock. Additionally, an adjustable feed gate is provided which governs the amount of feed directed to the feeding troughs during the movement of the agitators.

13 Claims, 6 Drawing Figures

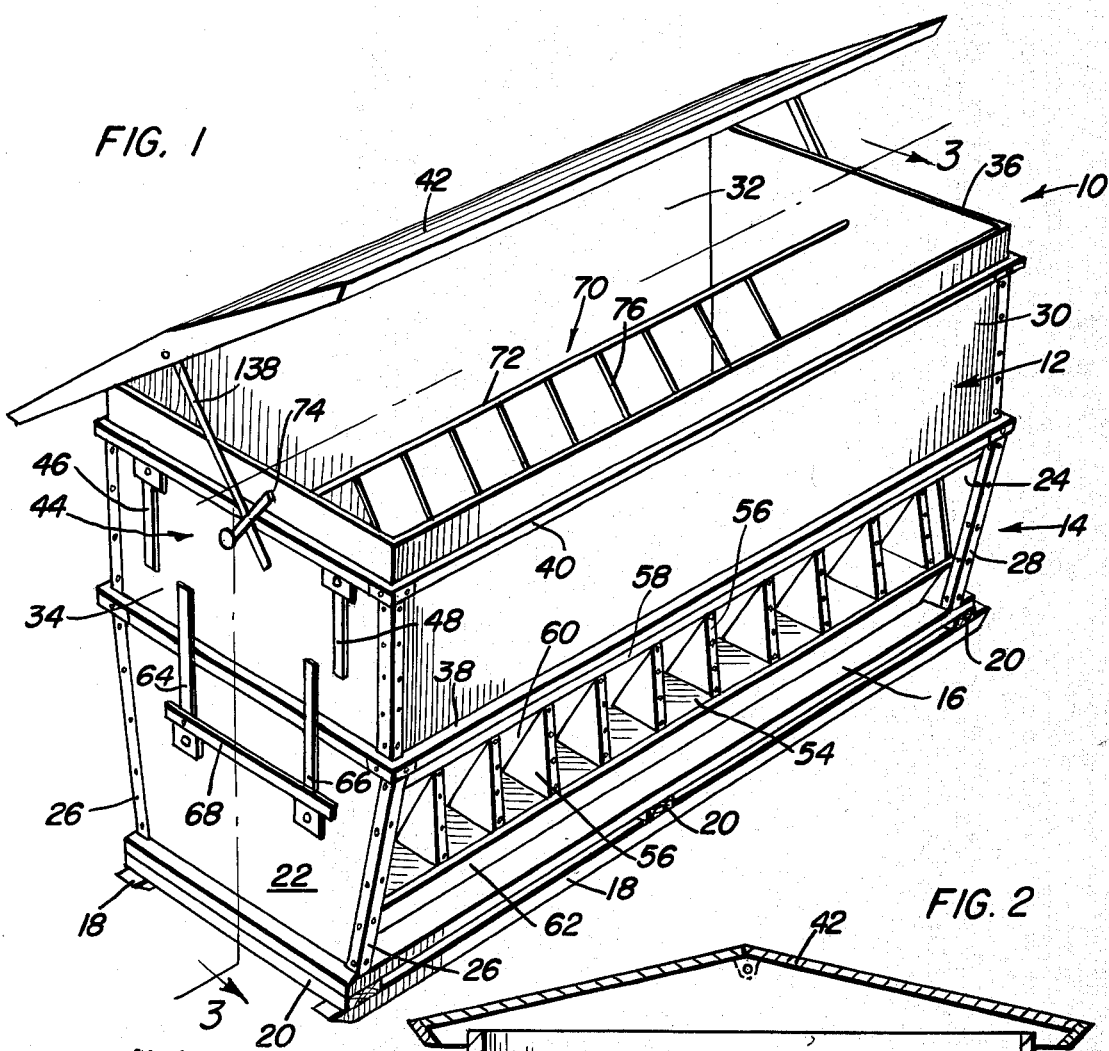
FIG. 1
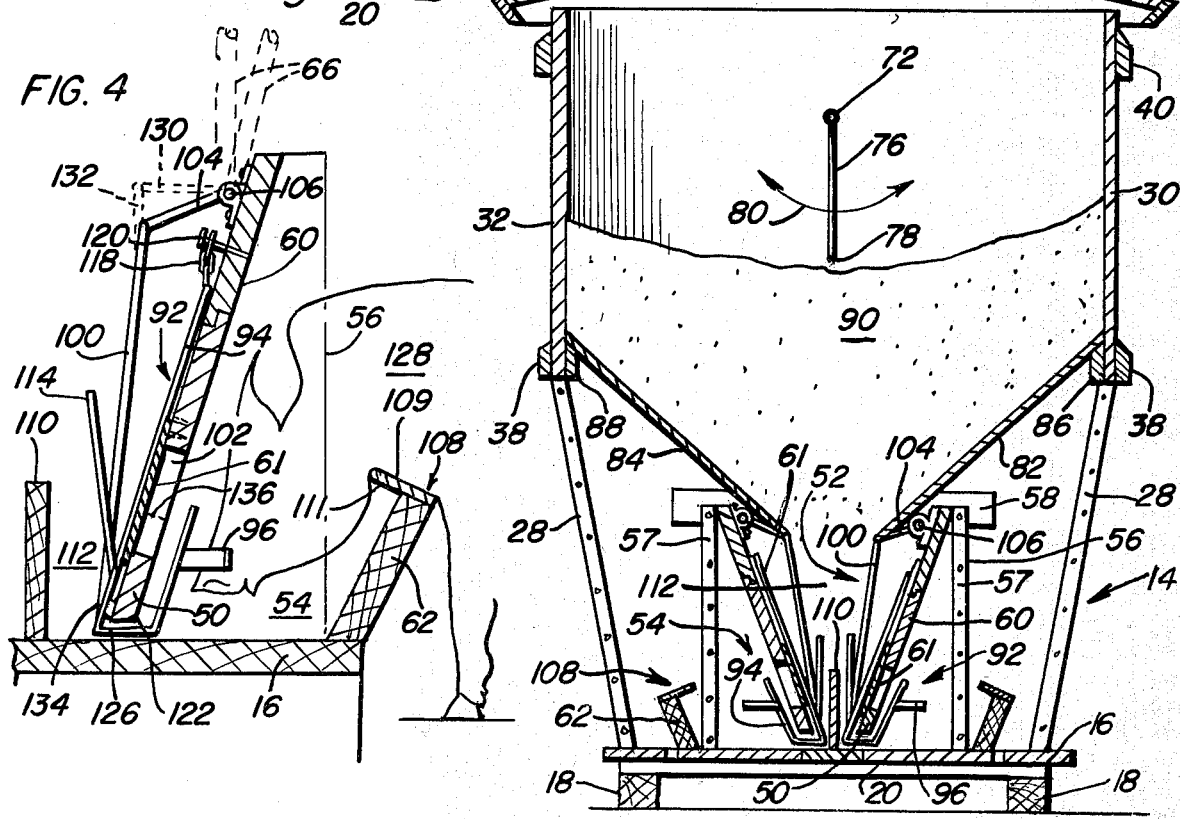
FIG. 2
FIG. 4

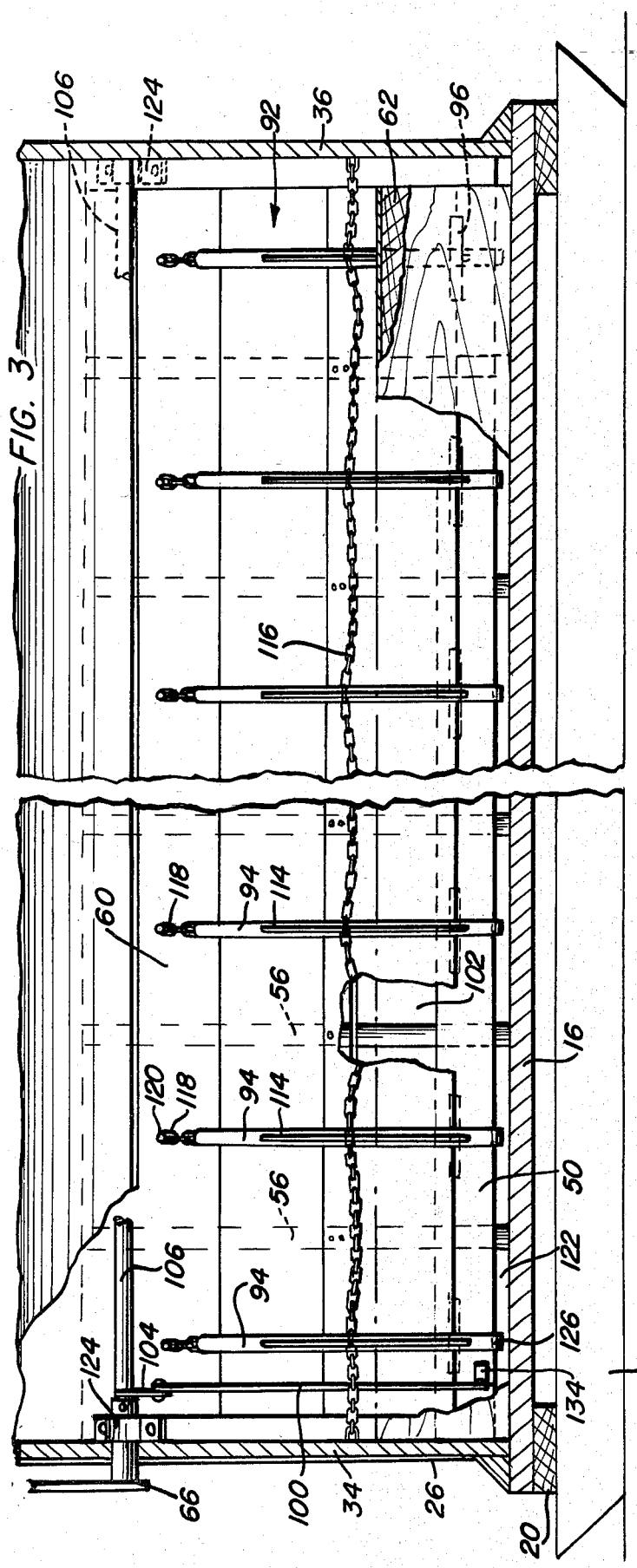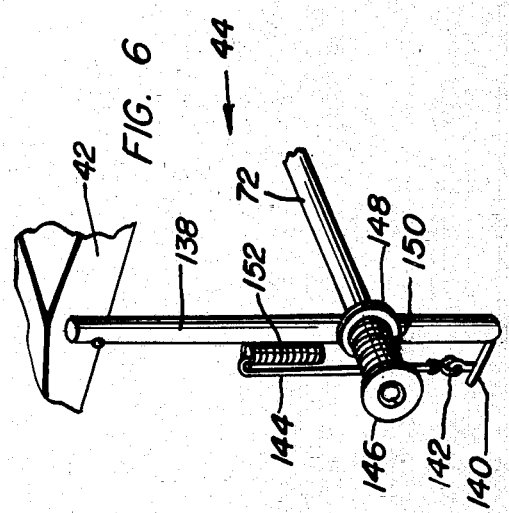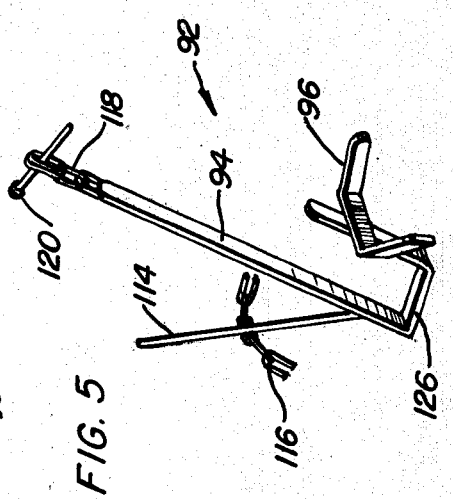

LIVESTOCK FEEDER WITH ADJUSTABLE FEED GATE

BACKGROUND OF THE INVENTION

1. Field of the Invention

The present invention relates to livestock feeders and more particularly pertains to hog feeders utilizing adjustable feed gates and agitators.

2. Description of the Prior Art

Those concerned with the development of livestock feeders, particularly hog feeders, have experienced great difficulty in the adjustment of the feed openings which are arranged at the bottom of the feeders to accommodate the gravity flow of feed therethrough. In many instances, the feed openings need to be adjusted due to changes in the rate of feed flow caused by emptying of the feeder, by weather conditions and by changes in the type of feed employed. Prior art feeders have included feed openings which could be adjusted only when the feeder is empty, as well as feed openings which are adjustable while a feeder is full.

As can be appreciated, it is desirable to have feed openings that are adjustable without undue effort even when a feeder is completely full of feed. Due to changing ambient weather conditions wherein increases in air moisture may be experienced, livestock feed typically becomes less flowable and thereby a larger opening in a feeder is desirable and often required. Additionally, different size openings may be required to insure a proper flow of feed to the feed troughs in dependence upon the size, number and activity of the hogs or pigs using the feeder. Another typical problem occurs when changes are made from one batch of feed to another, even assuming that a preliminary adjustment is made to the feed openings while the feeder is empty so as to accommodate the new mixture being supplied, since it is hard to predict how different batches of feed will flow and an "in use" adjustment may still be required to optimize the feed flow. Yet another problem occurs as a result of the gravity forces acting on the feed at the bottom of the feeder near the opening due to the compacting of the feed, such compacting becoming more of a problem when a greater amount of feed is contained in the feeder, and adjustments may be desired or required during the emptying of the feeder to overcome this compacting.

Some prior art pig feeders have also made use of agitating apparatus or the like arranged within a feeder to assure the free flow of feed. Problems have occurred, however, due to excessive expenditures relating to the manufacture and operation of such agitating apparatus. With respect to such agitating apparatus, there have been at least some attempts to provide agitating apparatus operable by the pigs themselves, but problems have arisen related to a substantial increase in cost of manufacture of the feeders, as well as additional maintenance and repair costs, not to mention the shut off of the feed supply in the event that an agitator comes into disrepair during use or does not operate as intended. Additionally, there has existed the problem of small pigs not being able to readily operate an agitator because their noses are not tough enough to withstand the effort.

As such, there has long existed a need for an improved livestock feeder which makes use of a cheap and efficient adjustable feed opening means in combination with an inexpensive, reliable agitator operable by even the smallest of pigs. The construction of the present invention overcomes the above-discussed problems, and represents a substantially improved livestock feeder which obviates the danger that the feed flow to the pigs will be shut off for a period of time unless a person continuously monitors the feeders. In effect, the present invention removes substantially all need for a continuous monitoring program so as to effectively be totally automatic in operation.

A better understanding of some of the above mentioned prior art problems and disadvantages can be had with reference to U.S. Pat. No. 3,019,766, issued Feb. 6, 1962 to Pannier, wherein there is disclosed a pig feeder having an over-all box-shaped configuration and having an upper section which constitutes a feed storage area. Feed openings are provided at the bottom of a lower section of the feeder, and converging side walls are provided for directing the feed downwardly to unadjustable openings through which the feed may be directed into feed troughs. Agitators comprising large heavy panels are used to keep the feed flowing into the feed troughs, such agitators being manually operable by an operator, and no means are provided for a pig to agitate the feed to facilitate the flow thereof.

At least one attempt has been made to provide a livestock feeder having an adjustable feed gate. In this connection, U.S. Pat. No. 4,147,132, issued Apr. 3, 1979, to Gilst, discloses a hog feeder having an upper section which constitutes a feed storage area and tapered side walls which converge to form a decreasing cross-sectional area in a downward direction. Feed openings provided at the bottom of the feeder are defined by side walls of the feeder which converge outwardly so as to present an increasing cross section expanded throat portion for promoting free flow of the feed into the feeder troughs. To accommodate adjustment of the feed openings, slide panels are connected to hand operable cranks disposed at the top of the feeder, so that the feed opening adjustments can be made independently of the amount of feed in the feeder and without a requirement for any separate tools. However, no means are provided for agitation of the feed by the hogs so as to control the movement of feed into the feed troughs.

SUMMARY OF THE INVENTION

The general purpose of the present invention is to provide a livestock feeder, particularly for use in feeding hogs, that has all of the advantages of similarly employed prior art livestock feeders and none of the above-described disadvantages. To attain this, the present invention provides for a livestock feeder having an over-all box-shaped configuration which utilizes a plurality of partitioned feeding troughs supplied by feed stored in an upper storage section of the feeder. Adjustable feed gates are provided within the interior of the feeder, such gates being manually operable to change the size of feed openings thereby to control the rate of feed flow into the individual feed troughs. Additionally, the feeder of the present invention is provided with individual agitator means located in each feed trough whereby the feeding livestock may individually agitate the feed within the feeder to increase the flow thereof into the feed troughs. In this respect, the individual agitators are formed of flat steel bars which are operable by even the smallest of pigs and which have limited or localized movement within the feed openings. Further, an oscillation chain connects a plurality of the agitators to assist in achieving an orderly and even flow of feed.

It is therefore an object of the present invention to provide a new and improved livestock feeder.

Another object of the present invention is to provide a livestock feeder which utilizes an adjustable feed gate.

A further object of the present invention is the provision of a livestock feeder which utilizes a new and improved agitator apparatus.

Still another object of the present invention is the provision of a livestock feeder which is particularly suited for the feeding of hogs.

Yet another object of the present invention is the provision of a livestock feeder which utilizes an agitator that may be effectively operated by small pigs.

A still further object is the provision of a livestock feeder which provides for the use of livestock-operable agitator means in combination with adjustable feed openings.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the livestock feeder in accordance with a preferred embodiment of the present invention;

FIG. 2 is a cross-sectional end view of the present invention;

FIG. 3 is a vertical cross-sectional view of the interior portion of the present invention taken along the line 3—3 of FIG. 1 and looking in the direction of the arrows;

FIG. 4 illustrates the agitator apparatus of the present invention as it might be actuated by a pig;

FIG. 5 is a detailed perspective view of the agitator apparatus of the present invention; and FIG. 6 is a detailed perspective view of the lift lid attachment as utilized on the present invention.

DESCRIPTION OF THE PREFERRED EMBODIMENT

Referring now to the drawings, and in particular, to FIG. 1 wherein there is illustrated in perspective a livestock feeder 10 constructed in accordance with the present invention. In this respect, the livestock feeder 10 includes a large storage bin 12 for the storage of grain and other types of livestock feed therein, the storage bin being disposed above and structurally supported by a feeding section 14. The feeding section 14 includes a bottom 16 supported by skids 18. In this connection, the skids 18 are attached to the bottom 16 by means of several transversely extending support members 20, thereby to support the bottom at a desired distance from the ground and to position the feeding section 14 at the proper height so as to facilitate access thereto by livestock. The skids 18 of course can be of any size depending on the size of the livestock feeder 10 and can be provided in any number.

The feeding section 14 has end walls 22, 24 attached to the bottom 16 and rising upwardly therefrom. The feeding section 14 further includes braces 26, 28 attached to the feeding section bottom 16 and angled slightly upwardly and outwardly so as to provide some protection from the weather as well as to increase the feed storage capacity. There are two sets of feeding section braces 26, 28, one being on each of the opposite longitudinal sides of the feeder. The braces 26, 28, along with the end walls 22, 24, support the storage bin 12 wherein the latter has front and rear walls 30, 32, respectively, and a pair of end walls 34, 36 which can be made as continuations of the feeding section end walls 22, 24 or can be made separate depending on the desires of the manufacturer. Reinforcing battens 38 and 40 extend around the outside of the storage bin 12 and are bolted or otherwise fastened in place. The size and capacity of the bin 12 can be altered by making the walls 30, 32, 34, 36 vertically higher or lower.

The top or roof 42 of the livestock feeder 10 is constructed of one or more panels that are secured together to define a slight pitch for water drainage. The roof 42, which normally covers the storage bin 12, can be swung up and back to a slightly over vertical center position, as clearly illustrated in FIG. 1, through the use of a lift roof attachment 44 thereby facilitating loading of the bin 12 with feed.

Positioned proximate to the storage bin end wall 34 are a pair of manually operable levers 46, 48 which are pivotable in relation thereto and are connected to an adjustable meter board 50, which will be subsequently described in the further views of the drawings, through a linkage system 52 positioned interiorly of the feeder 10.

Feeding section 14 is further illustrated in FIG. 1 as including a plurality of feeding troughs 54 into which feed may be deposited for consumption by livestock, the construction of such troughs including a plurality of dividers or braces 56, which rise upwardly from the bottom of the feeding troughs and which are effectively partitions between the respective troughs 54, and a stringer 58 supported by the braces. The feeding troughs 54 are further defined by an inwardly and downwardly inclined panel 60, which constitutes a back portion of the troughs, and a front strip 62 which forms a portion of the snuffle bar 108.

Further illustrated in FIG. 1 is an alternative style and location of manually-operable levers for operating the adjustable meter board 50, these levers 64, 66 being positioned at a lower elevation on the feeding section end wall 22, as opposed to the manually-operable levers 46, 48 which are positioned at a higher elevation on the storage bin end wall 34. Of course, only one set or the other of these manually-operable levers, 46, 48 or 64, 66, would normally be used. With respect to the manually-operable levers 64, 66, it can be seen that a cross bar 68 is provided whereby the levers are positioned behind the cross bar in such a manner that they may still be pivotally rotated to effect an adjustment of the meter board 50 while at the same time, the cross bar 68 effectively protects them from being bent outwardly and thus becoming damaged. Also partly illustrated in FIG. 1 is a feed distributor 70 which includes a longitudinally mounted rod 72 pivotally supported in the respective end walls 34, 36 and being rotatable through the manual manipulation of handle 74. Fixedly attached to and orthogonally aligned with the horizontally extending rod 72 is a plurality of smaller feed distributing rods 76. The rods 76 have free ends 78, as illustrated in FIG. 2, and their individual longitudinal axes lie substantially in the same plane, whereby a back and forth rotatable movement of the longitudinally mounted rod 72 effects a movement of the rods 76 in a manner illustrated by the arrows 80. As can be appreciated, the back and forth movement of the rods 76 assist an operator in evenly distributing the feed grain 90 within the storage bin 12.

With particular reference to FIG. 2 of the drawings, which is a cross-sectional end view of the livestock feeder 10, it can be seen that the feeding section 14 is made up of the two inwardly and downwardly inclined panels 82, 84 whose upper edges are supported on strips 86, 88 attached to walls 30, 32, respectively, and disposed on the two groups of braces 26, 28. The boards or panels 82, 84 eliminate bridging of the feed 90, as well as supporting much of the feed weight, on an agitator apparatus 92 to be subsequently described. FIG. 2 further illustrates the effect of the back and forth rotatable movement of the rods 76. In this connection, it can be seen that as the rods 76 move in the direction of the arrows 80, feed grain 90 will be moved away from the longitudinally extending center portion of the storage bin 12 and ouwardly towards the interior side of the wall 30, 32, thereby to reduce the amount of grain weighing directly down toward a feed distributing portion of the feeder 10 and evenly distributing the same to facilitate an orderly and continuous flow of grain downwardly. Additionally, the use of the feed distributor 70 facilitates the filling of the storage bin 12 since the feed 90 may be evenly distributed therein during such filling without peaks forming at those locations where the feed is being deposited within the bin.

FIG. 2 further illustrates the positioning of the aforementioned agitator apparatus 92 which includes the use of an agitator 94 having a livestock nose engaging portion 96 positioned within the area of the feeding trough 54. Further partially illustrated in FIG. 2 is the slidable adjustable meter board 50, priorly discussed but not illustrated with reference to the discussion of FIG. 1, such board forming a part of inclined panel 60. A steel plate 61 provides an enclosure to prevent feed loss over the top of the gate of meter board 50 when the gate is in a lowered position shutting off the flow of feed 90 to the troughs 54. As is now apparent with reference to the drawings, the livestock feeder 10 of the present invention is of a symmetrical construction whereby pigs or other livestock may feed on respective sides of the feeder. Accordingly, the construction of one side as discussed pertains equally well and equivalently describes the operation of those parts present on the other side.

Also illustrated in FIG. 2 is a linkage member 100 which operates to slide the adjustable meter board 50 and which forms a part of the adjustable meter board linkage system 52. In this connection, the linkage member 100 is pivotally attached at one end 134 thereof to the adjustable meter board 50 and has its other end pivotally attached to a second linkage member 104 which is orthogonally, fixedly attached to a rotatable shaft 106. The second linkage member 104 serves to eccentrically offset the linkage member 100 from the rotatable shaft 106, so that any rotation of the shaft will effectively cause an upwardly or downwardly directed movement of the linkage member 100 thereby to slidably control the adjustment of the adjustable meter board 50. The positioning of the meter board 50 of course controls the amount of feed 90 which may be directed into the feed trough 54. Also illustrated is the snuffle bar 108 comprising a front strip 62 and having fixedly positioned on a top portion thereof a strip 109, the function of which will be subsequently described. A migration board 110 is shown positioned within the throat portion 112 of the feeder 10. The migration board 110 serves to divide the throat portion 112 of the feeding section 14 so that feed 90 cannot be pulled from one side to the other during a supplying of the opposed feeding troughs 54. Additionally, the migration board 110 serves as a bump board for the agitator 94 when the same is forced inwardly into the throat portion 112 as when a hog comes into engagement with the livestock nose engaging portion 96. Further illustrated in this Figure is the use of a tin strip 57 which is wrappable around, countersunk or routed and attachable to the outside edge of the braces 56 so as to prevent damage to both the livestock and the braces during feeding of the livestock.

FIG. 3, which is a partial sectional view taken along the line 3—3 of FIG. 1, illustrates in greater detail the construction of the agitator apparatus 92 of the present invention. In this respect, it can be seen that a plurality of agitators 94 are provided, each of which is in communication with one feeding trough 54 as defined by the dividers or braces 56 positioned on opposite sides thereof and shown in broken lines 56. Each agitator 94 includes a steel bar or feed poker 114 fixedly attached thereto and being operably associated with the pokers contained on other agitators through the use of a chain 116. Each feed poker 114 is essentially a steel bar which is welded or otherwise fixedly attached to the agitator 94 in a sloped relation thereto and in a manner more clearly illustrated in FIG. 5. The agitators 94 are floatingly held in position through the use of a short chain link 118 which allows oscillating movement and which is fixedly attached to an agitator at one end thereof and is attached at its other end by conventional means to the inclined panel 60. In the preferred embodiment of the present invention, such conventional attaching constitutes the use of no more than a nail or bolt 120.

Proximate to the feeding section bottom 16 is illustrated a feed opening 122 which extends along substantially the entire horizontal length of the livestock feeder 10 and which serves to establish a communication between the throat portion 112 of the feeder and the individual feeding troughs 54. The feed opening 122 may be varied in size to thereby control the rate of flow and amount of feed 90 deliverable to a feed trough 54 through the aforedescribed movement of the adjustable meter board 50. In this respect, the meter board 50 is shown as extending along the entire horizontal length of the feeder 10 with the bottom edge thereof, which is $\frac{3}{4}''$ wide and parallel to the bottom of the feeder, acting in conjunction with the feeding section bottom 16 to define the feed opening 122. The slide opening 102 is also illustrated as extending along the entire horizontal length of the feeder 10 and serves to permit slidable containment of the meter board 50 in the inclined panel 60.

The sliding movement of the meter board 50 is controlled by the meter board linkage system 52 in the manner priorly discussed. In this respect, the linkage member 100 is shown pivotally attached to the second linkage member 104, such second linkage member being fixedly attached to and rotatable with the shaft 106. A bracket 124 positioned at one end of the rod 106 and having a counterpart at the other end of the rod serves to support the rod in position while providing a bearing surface about which the rod may rotate at the discretion of an operator. In the embodiment of FIG. 3, the alternative connection utilizing levers 64, 66 is illustrated, but it is to be understood that the linkage system 52 could just as easily have been attached to the first described manually-operable levers 46, 48 positioned at a topmost portion of the feeder 10 as shown in FIG. 1.

Returning to a discussion of the construction of the agitator apparatus 92, it can be seen that the agitator 94 has a lower, essentially horizontally extending portion 126 which is in substantially parallel alignment with the feeding section bottom 16 and which extends through the feed opening 122, thereby to allow a positioning of the livestock nose engaging portion 96 within the area of the respective feed trough 54.

With reference to FIG. 4 of the drawings, a better understanding of the operation of the agitator apparatus 92 can be ascertained. Specifically, the agitator 94 is shown in position whereby it is fixedly attached by means of oscillating chain link 118 and nail 120 in a floating relationship to the inclined panel 60. In this connection, the lower extending portion 126 of the agitator 94 is shown extending through the feed opening 122 whereby it is apparent that the agitator 94 may be moved in an up and down manner so as to permit a reciprocable movement of the lower extending portion 126 within the opening 122. This movement is normally effected by a hog 128 coming into engagement with the livestock nose engaging portion 96 thereby to shove the same in a direction towards the inclined panel 60. The reciprocal movement of the extending portion 126 of the agitator 94 results in a concurrent movement of the feed poker 114 within the feed 90 contained in the throat portion 112. This movement of the feed poker 114 agitates the feed 90 to effectively cause movement of the same downwardly towards the feed opening 122.

With reference to the perspective view of the agitator apparatus 92 as shown in FIG. 5, it can be seen that the feed poker 114, which is fixedly attached to the agitator 94, is in communication with all of the other feed pokers associated with their respective agitators and feed troughs 54 through the use of the chain 116, hereinafter referred to as the localizing chain. In this connection, selected individual links of the localizing chain 116 are positioned over and attached to the individual feed pokers 114, and the chain is further anchored at each end thereof to the respective end walls 34, 36 of the feeder. As such, the localizing chain 116 moves in response to a movement of one of the feed pokers 114, and this chain movement causes some movement of the feed poker associated therewith, thereby to cause a respective feed movement into the associated feed trough 54. Accordingly, the localizing chain 116 serves to give each agitator 94 a spring biased, limited or localizing action.

Referring again to FIG. 4 of the drawings, it can be seen that the aforedescribed operation of the adjustable meter board 50 is more clearly illustrated. In this respect and as depicted by the broken lines 136, it can be appreciated that during a rotation of the shaft 106, the second linkage member 104 moves to the position 130, thereby causing a similar upward movement of the linkage member 100 to a position 132. Since the linkage member 100 is pivotally attached at 134 to the adjustable meter board 50, it is apparent that the board 50 will effectively be moved up in the slide opening 102 to a position shown by the broken lines 136 thereby increasing the size of the feed opening 122.

Also with reference to FIG. 4, a better understanding of the snuffle bar 108 including the strip 62 having attached thereto strip 109 can be ascertained. Specifically, the strip 109 is attached to the strip 62 in a manner whereby the lip 111 is directed inwardly over a feeding trough 54. This construction effectively protects a feeding trough from damage and at the same time, the overhanging lip 111 serves to keep feed 90 within the trough which might otherwise be dispelled therefrom through the snorting and rooting of the hog's nose within the feed.

FIG. 6 illustrates in perspective the details of construction of the lift roof attachment 44. In this respect, the end walls 34, 36 to which the attachment 44 is connected are not shown while a portion of the roof 42 pivotally attached to a roof support rod 138 is illustrated. The rod 138 is positioned alongside of and slidably disposed in relation to the aforedescribed longitudinally mounted rod 72, such rod being rotatably positioned within the unshown storage bin end walls 34, 36. A projection 140 is fixedly attached to and extends perpendicularly from the support rod 138 at one end thereof. A conventional eyebolt 142 is securely attached to the projection 140, all of these attachments being made by conventional means, such as by welding, or the like, and a conventional aircraft cable 144 may then have an end thereof attached to the eyebolt. The shaft 72 has provided at an end thereof a pair of zinc washers 146, 148, such washers being fixedly attached to the shaft in a spaced-apart relationship thereby to form a spool 150 about which an intermediate portion of the cable 144 may be wound. The other end of the cable 144 is then attached to a compression spring 152 which is itself longitudinally aligned with and fixedly attached to the roof support rod 138. In this respect, one of the washers may be punched for a windlass lock so that the roof 42 may be locked open or closed.

As is apparent, any movement of the roof 42 results in a relative movement between rod 138 and rotatable shaft 72, and as such, cable 144 translates the movement of the rod 138 into a rotatable movement of the shaft 72 through a rotation of spool 150. As shown in FIG. 1, a handle 74 is envisioned as being attached to the shaft 72, so that a movement of the handle 74 effects both a rotation of the shaft 72 and at the same time causes a lifting action of the rod 138 to thereby move the roof 42 into a position such as illustrated. However, due to the use of the compression spring 152, some movement of the handle 74 may be effected to cause a movement of the feed distributor 70 without an accompanying movement of the roof 42. In essence then, within one range of movement of the handle 74, the feed distributor 70 may be effectively operated to distribute feed within the storage bin 12, while a greater rotational movement of the handle 74 results in an accompanying movement of the roof 42 into a desired position. The compression spring 152 also allows further movement of the feed distributor 70 in the manner of operation for which it is designed even after the roof 42 is in some position other than a sealing relationship with the storage bin 12.

In utilizing the present invention, it can be appreciated with reference to FIG. 1 of the drawings, that an operator would first rotate the handle 74 to effect a positioning of the roof 42 permitting access to the storage bin 12. Feed 90 may then be deposited in the bin 12 and, to the extent required, may be distributed by a back and forth movement of the handle 74 to cause a rotational movement of the feed distributor 70. As illustrated in FIG. 2, the rotational movement of the feed distributor 70 causes a back and forth movement of the feed distributing rods 76 so as to evenly distribute the feed 90 within the storage bin 12 thereby to facilitate a continued and complete even filling thereof.

Once the storage bin 12 is filled to the desired extent, an operator may reposition the roof into a closed position and may then adjust the size of the feed opening 122 depending on weather conditions and the type of feed employed. In this connection, the operator need only to manually move the respective levers 64, 66 or 46, 48 to adjust the feed opening 122 as illustrated in FIG. 4. Movement of the levers 64, 66 or 46, 48 results in a rotation of the rotatable shaft 106, such rotation then being translated through second linkage member 104 to linkage member 100 pivotally connected at one end thereof to the member 104. Since the other end of the linkage member 100 is pivotally attached to the adjustable meter board 50 at a pivotal connection point 134, it can be appreciated that the meter board 50 will slide within the slide enclosure 102 opening up to the position shown by the broken lines 136 to thereby vary the size of the feed opening 122.

The hog 128 desiring to eat some feed may then position his head, in the manner illustrated in FIG. 4, within the feed trough 54 and may engage the agitator apparatus 92. Specifically, the hog 128 routs upwardly against a livestock nose engaging portion 96 of the agitator 94 to cause an oscillating movement of the agitator about generally a longitudinal axis of the agitator 94 and a connection point defined by the nail 120, such movement causing an oscillating movement of a feed poker 114 positioned within the body of feed 90. As such, the feed 90 is agitated and caused to fall down into the throat portion 112 of the feeder 10 and thence to be directed outwardly through the feed opening 122 for consumption by the hog 128.

With respect to the above description, it should be realized that optimum dimensional relationships for the parts of the invention are deemed readily apparent and obvious to one skilled in the art, and all equivalent relationships to those illustrated in the drawings and described in the specification are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An animal feed apparatus comprising:
   a storage bin for storing animal feed;
   a feeding section means having a passage for feed to flow from the bin to at least one animal feeding trough including a snuffle bar with a lip inwardly directed over the at least one animal feeding trough for retaining said animal feed therewithin and the feeding section means including divider means associated with said storage bin to which animal feed stored in said storage bin is directed;
   feed opening means associated with said feeding section means feeding section means and said at least one animal feeding trough;
   said feeding section means including an inwardly inclined panel spaced from said snuffle bar;
   feed opening adjustment means including an adjustable meter board slidably positioned within the passage of the feeding section means and supported by said inclined panel, means for the movement of the meter board to cause a change in size of the feed opening means, the feed opening adjustment means including means connected with the meter board for adjusting said feed opening means to thereby control a rate of flow of feed from said feeding section means through said feed opening means; and
   agitator means having one end thereof positioned within said feeding section means and the other end thereof positioned within said feeding trough and terminating in a livestock nose engaging means, said agitator means being floatingly attached by chain link means at the one end thereof to an upper portion of said inwardly inclined panel of said at least one animal feeding section means and including means effectively biasing the movement of the agitator means operable to agitate said animal feed to facilitate the movement thereof to said feed opening means.

2. The animal feeder apparatus as defined in claim 1, wherein said included adjusting means includes a handle mounted exteriorly of said storage bin and being rotatably attached to a rod positioned within said storage bin, said rod having at least one eccentric mounted thereto, said eccentric being pivotally attached to one end of a linkage and the other end of said linkage being pivotally attached to said meter board, whereby a movement of said handle causes a rotation of said rod to thereby reciprocably move said linkage thus sliding said meter board to change the size of said feed opening means.

3. The animal feeder apparatus as defined in claim 1, wherein said feeding section means includes the use of sloping feed panels attached to and forming a part of said storage bin, said sloping feed panels serving to prevent bridging of animal feed and excessive feed weight on said agitator means and other undesirable distributions of animal feed in said storage bin which serve to prevent an orderly and even flow of animal feed to said feed opening means.

4. The animal feeder apparatus as defined in claim 1, wherein said at least one feeding trough being defined by braces which serve to partition said at least one feeding trough from areas adjacent thereto, said braces having tin wrapped and countersunk or routed thereabout on edge portions thereof to prevent animals feeding in said at least one feeding trough from becoming injured.

5. The animal feeder apparatus as defined in claim 1, wherein said divider means includes the use of a migration board centrally positioned therein so as to prevent animal feed from migrating from feed opening means on one side of said feeding section to feed opening means on the other side.

6. The animal feeder apparatus as defined in claim 1, wherein said livestock nose engaging means may be rooted by an animal to facilitate the movement of animal feed through said feed opening means.

7. The animal feeder apparatus as defined in claim 1, wherein said livestock nose engaging means is generally U-shaped.

8. The animal feeder apparatus as defined in claim 1, wherein the end of said agitator means positioned within said feeding section means includes a feed poker fixedly attached proximate thereto, said feed poker serving to facilitate the agitation of animal feed contained within said feeding section means during the movement of said agitator means.

9. The animal feeder apparatus as defined in claim 1, wherein said feed opening means serves to communicate said feeding section means with an individual feeding trough to thereby facilitate movement of animal feed from said feeding section to said feeding trough, a localizing agitator means further including a feed poker attached thereto, an associated feed poker serving as connection means for said chain for translating localizing movement thereto.

10. The animal feeder apparatus as defined in claim 1, wherein said storage bin is bounded by upper sidewall means and having a roof means, said roof means including a section supported by two radius arms pivotally connected to the roof means and an adjustable linkage associated therewith for permitting movement of said section relative to said storage bin to thereby permit the filling of said storage bin with animal feed, said adjustable linkage including said radius arms being pivotally attached at one end thereof to said section and having the other end thereof including means supportably connected to a spool means by a cable means connected to the radius arms whereby said section is rotatably supported from one portion of said upper sidewall means directly by said cable means.

11. The animal feeder apparatus as defined in claim 10, wherein said spool means is spring biased and a movement of said section results in a relative movement of the end of said radius arms by said cable means to said spool means thereby causing a winding or unwinding of said spool means.

12. The animal feeder apparatus as defined in claim 11, wherein said spool means is spring biased by means of a compression spring fixedly attached to said roof support rod, said cable means having one end thereof attached to said compression spring and having the other end thereof attached to an end of said radius arms.

13. The animal feeder apparaus as defined in claim 12, wherein said spool means is fixedly attached to a rod longitudinally mounted in said storage bin, said longitudinally mounted rod having a plurality of smaller rods fixedly and orthogonally attached thereto, whereby a rotatable movement of said spool means results in a similar rotatable movement of said longitudinally mounted rod to thereby cause said plurality of smaller rods to agitate animal feed stored in said storage bin so as to evenly disburse the same within said bin.

* * * * *